United States Patent [19]

Hall

[11] Patent Number: 4,665,937
[45] Date of Patent: May 19, 1987

[54] BALL VALVE AND METHOD FOR ASSEMBLING SAME

[76] Inventor: Rowland G. Hall, 834 E. Orange Grove Ave., Burbank, Calif. 91501

[21] Appl. No.: 798,230

[22] Filed: Nov. 14, 1985

[51] Int. Cl.[4] ............... F16K 43/00; F16K 41/00; F16K 1/14
[52] U.S. Cl. ............... 137/15; 137/315; 251/214; 251/315; 251/316; 251/317
[58] Field of Search ............... 137/15, 315; 251/315, 251/316, 317, 214

[56] References Cited

U.S. PATENT DOCUMENTS

| | | | |
|---|---|---|---|
| 3,228,652 | 1/1966 | Antrim | 251/315 |
| 3,323,542 | 6/1967 | Magos et al. | 251/315 |
| 3,486,736 | 12/1969 | Scaramucci | 251/317 |
| 3,636,972 | 1/1972 | Scaramucci | 251/315 |
| 3,912,221 | 10/1975 | Ferster et al. | 251/214 |
| 4,423,749 | 1/1984 | Schmitt | 251/317 |
| 4,558,874 | 12/1985 | Williams et al. | 251/214 |

*Primary Examiner*—George L. Walton
*Attorney, Agent, or Firm*—Poms, Smith, Lande & Rose

[57] ABSTRACT

An improved ball valve and method for assembling same having a main valve body with an axially extending throughbore for the passage of fluids therethrough. A ball having a throughbore is mounted in the valve body passageway and rotatable therein from a first position aligning the throughbore through the ball with the throughbore through the valve body permitting fluids to pass through the aligned throughbores, to a second position wherein the body of the ball seals off the throughbore through the valve body stopping passage of fluid therethrough. The ball is rotatable by a stem keyed to the ball having a shaft extending out of an opening in the valve body, the axis of the opening being normal to the axis of the throughbore through the valve body. The inner wall of the valve body includes an interrupted boss thereon receiving in the opening of the boss a stem retaining member which encircles the stem between the engagement of the stem with the ball and the inner wall of the valve body to retain the stem in operative position in the ball assembly while compressing and guiding an O-ring on the stem so that the O-ring seals off fluids inside the valve body from the exterior thereof.

8 Claims, 4 Drawing Figures

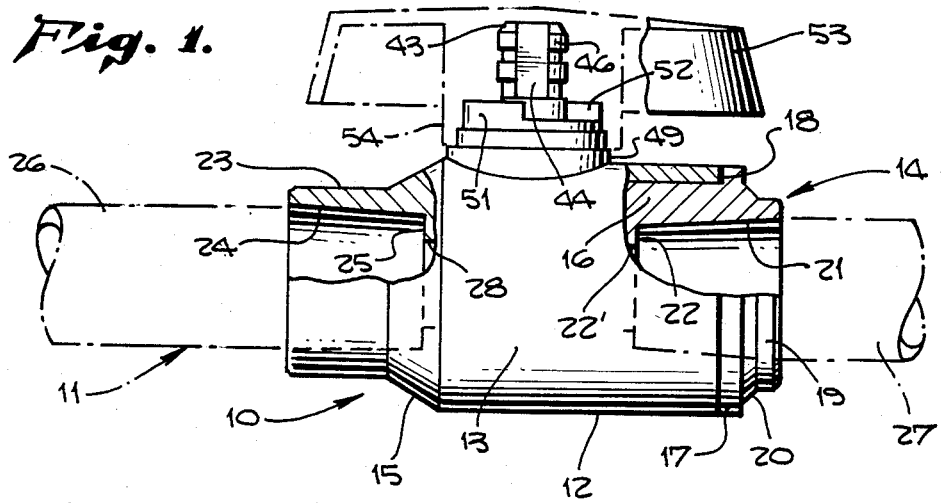
Fig. 1.
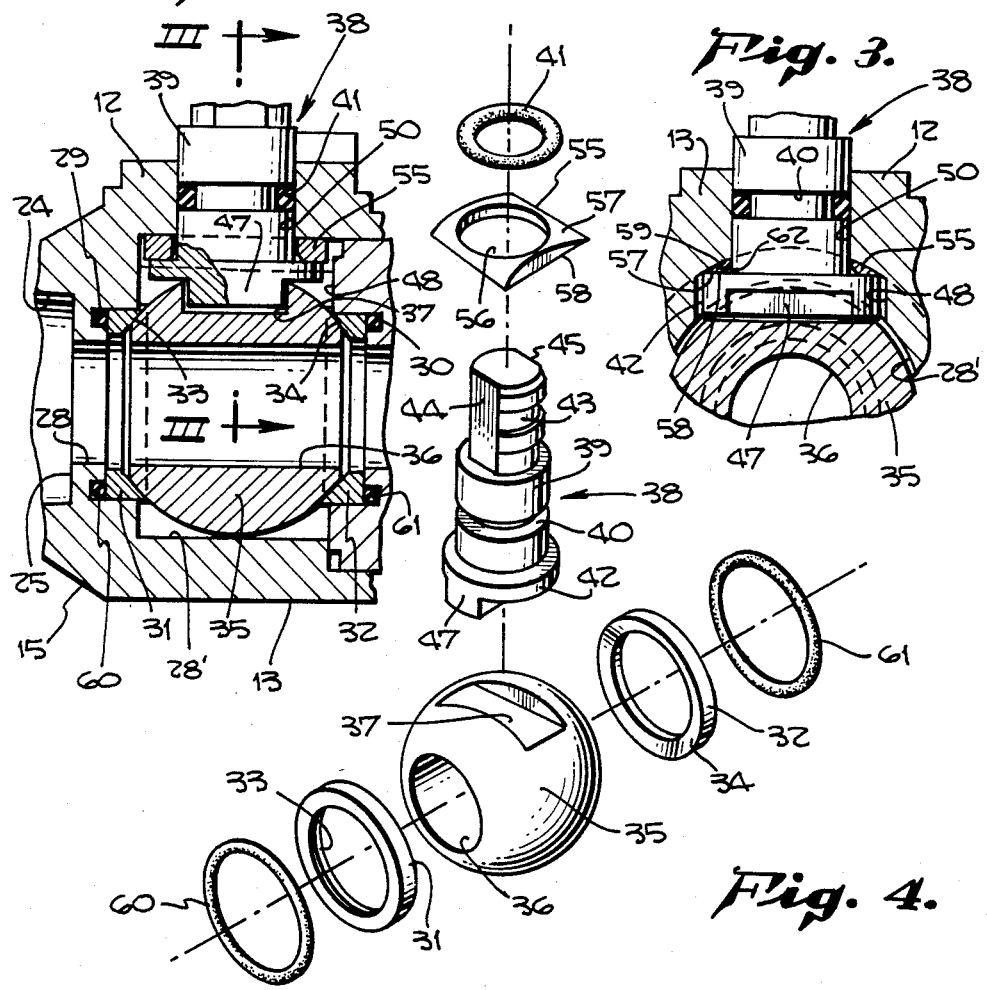
Fig. 2.
Fig. 3.
Fig. 4.

BALL VALVE AND METHOD FOR ASSEMBLING SAME

BACKGROUND OF THE INVENTION

1. Field of the Invention

The invention relates to ball valves; and, more particularly, to an end entry ball valve having an improved seal on the ball stem sealing off fluids in the interior of the valve from the exterior thereof.

2. Description of the Prior Art

Ball valves are well known in the art. Such valves generally include a main valve body having a throughbore with an apertured ball mounted in the throughbore. The ball is rotated by a valve stem passing out of the valve body so that the aperture in the ball can be selectively aligned with the throughbore through the valve body. Such end entry prior art ball valves are assembled by inserting the valve stem from inside the body. An O-ring is mounted in a groove on the stem to seal off fluid inside the valve from the exterior. The valve stem is inserted through a hole in the valve body. This hole requires a chamfer or counterbore to compress and guide the O-ring up into the stem hole. This counterbore, formed on the interior wall of the valve body surrounding the stem hole, is expensive to machine and requires a considerable amount of time to do so.

There is thus a need for a means for compressing and guiding the O-ring on a valve stem up into a seat on the valve stem hole without need for expensive and time consuming machining.

SUMMARY OF THE INVENTION

It is an object of this invention to provide an end entry ball valve having an improved seal between the valve stem and the interior of the valve.

It is a further object of the invention to provide a ball valve having a seal between the valve stem controlling the ball of the valve and the exterior thereof without need for machining a chamfer in the interior of the valve body.

It is another object of this invention to provide an improved method for assembling end entry ball valves.

It is still another object of this invention to carry out the foregoing objects in an inexpensive manner with parts that snap-fit together quickly and easily.

These and other objects are preferably accomplished by providing a ball valve assembly having a main valve body, with an axially extending throughbore for the passage for fluids therethrough. A ball having a throughbore is mounted in the valve body passageway and rotatable therein from a first position aligning the throughbore through the ball with the throughbore through the valve body permitting fluids to pass through the aligned throughbores, to a second position wherein the body of the ball valve seals off the throughbore through the valve body stopping passage of fluid therethrough. The ball is rotatable by a stem keyed to the ball having a shaft extending out of an opening in the valve body, the axis of the opening being normal to the axis of the throughbore through the valve body. The inner wall of the valve body includes an interrupted boss thereon receiving in the opening of the boss a stem retaining member which encircles the stem between the engagement of the stem with the ball and the inner wall of the valve body to retain the stem in operative position in the ball valve assembly while compressing and guiding an O-ring on the stem so that the O-ring seals off fluids inside the valve body from the exterior thereof.

BRIEF DESCRIPTION OF THE DRAWING

FIG. 1 is a vertical, partly sectional, view of a ball valve assembly in accordance with the invention mounted in a fluid conduit.

FIG. 2 is a vertical sectional view of a portion of the valve assembly alone of FIG. 2.

FIG. 3 is a view taken along lines III—III of FIG. 2; and

FIG. 4 is an exploded view of the valve assembly of FIGS. 1 to 3.

DESCRIPTION OF THE PREFERRED EMBODIMENT

Referring now to FIG. 1 of the drawing, a ball valve assembly 10 is shown disposed in operative position in a fluid conduit 11. As seen in FIG. 1, ball valve assembly 10 includes a valve body 12 having a main body portion 13 that is generally cylindrical and a forward cylindrical end 23 of lesser diameter tapering at taper 15 into connection with body portion 13.

As seen in FIG. 1, a rear cap 14 closes off the other end of main body portion 13. Cap 14 preferably has a generally cylindrical main body portion 16 related to the interior diameter of main body portion 13 so that it frictionally fits therein, as seen in FIG. 1. Cap 14 has a peripheral flange 17 that abuts against the terminal end 18 of body portion 13. Cap 14 also includes a cylindrical portion 19, of lesser diameter than body portion 16, extending from portion 16 and interconnected thereto by tapered section 20. Cap 14 has a tapered socket bore 21 leading therein and into the interior of main body portion 13. An abutment wall 22 is provided on the interior of cap 14 with a throughbore 22' provided in cap 14.

Cylindrical portion 23 also has a tapered socket bore 24 leading into the interior of main body portion 13 with an abutment wall 25 provided on the interior thereof. Both portion 23 and cap 14 are coupled to portions 26 and 27 of fluid conduit 11 in any suitable matter. Since main body portion 13 has a throughbore 28', FIG. 3, aligned with throughbore 28 (FIG. 1) communicating with socket bore 24, fluid communication is provided through ball valve assembly 10 via coaxially aligned throughbores 22', 28, 28' and socket bores 21 and 24.

As seen in FIG. 2, an annular groove 29 is provided at wall 25 and an annular groove 30 is provided at wall 22. A ball guide 31 is provided against wall 25, as seen in FIG. 2, whereas a ball guide 32 is provided against wall 22. As seen in FIG. 4, these guides 31, 32, are ring-like members having a tapered surface extending therearound in the direction of the interior of main body portion 13 (see tapered facing surfaces 33, 34, respectively, in FIG. 2). These surfaces 33, 34 form a seat or guide for ball 35 as will be discussed. Adjacent said annular groove 29, an inner wall surface of said wall provides a shoulder, said shoulder acts as a stop for said ball 35.

Ball 35 is seen in FIG. 4 as spherical having an outer diameter generally the same as the inner diameter of body portion 13 and having a circular throughbore 36 generally related to the throughbore 28', with a slot 37 cut along the top thereof. A valve stem 38 is provided having a main generally cylindrical body portion 39, having groove 40 therein, for receiving a resilient O-ring 41 as will be discussed, and a lower circular flange 42, of greater outer diameter than body portion 39, connected to body portion 39. An elongated stem 43 extends upwardly from body portion 39 having flats 44, 45 on each side thereof and spaced annular ribs 46 (see FIG. 1). Flange 42 includes a generally rectangular block-shaped member 47 on its undersurface of a configuration related to that of slot 37 for reasons to be discussed. As seen in FIG. 3, wall 22 is broken at top to form a space 48. Flange 42 and block shaped member 47 of valve stem 38 are adapted to be placed within this space 48 as will be discussed.

Looking again at FIG. 1, it can be seen that a circular boss 49 having an opening 50 (FIG. 2) is provided on the upper surface of main body portion 13. A pair of upstanding spaced flanges 51, 52 are provided on boss 49. A key or operating handle 53 having a downwardly extending hollow cylindrical member 54, receives therein stem 43 and is internally configured thereto to flanges 51, 52. It can be appreciated that turning handle 53 thus also turns stem 43 in any desired direction. Of course, handle 53 may be eliminated and stem 43 rotated manually, if desired. Also, other means may be used to engage stem 43 to rotate the same. A pair of resilient O-rings, 60 and 61 are provided (FIG. 4) adapted to be mounted in grooves 29 and 30, respectively (FIG. 2).

As particularly contemplated in the present invention, stem retainer means are provided for retaining the stem 43 in proper position in hole 50. Such means includes a generally square shaped member 55, being generally arcuate in cross section with a curved top 57 and flat bottom 58, and a central hole or aperture 56.

In operation, member 55 is now slid into the groove or space 48 formed internally of main body member 13 in wall 22 (see FIGS. 2 and 3). The curved side 57 abuts against the curved inner surface 59 of main body member 13 (see FIG. 3). O-ring 41 is now inserted onto stem 48 and slid down into groove 40. Stem 48 is now inserted into the hole 56 in member 55, which guides it into the stem hole 50, and is then pressed firmly into the hole 50 in body portion 13. The chamfer 62 (FIG. 3) at the bottom of hole 56 in member 55 causes O-ring 41 to compress and slide into the hole 50. The flat bottom 58 of member 55 provides a retainer seat for stem 38.

O-ring 60 is now inserted into groove 29 (FIG. 2) and guide 31 is inserted against wall 25. Ball 35 is now inserted into body section 13 within throughbore 28' with slotted opening 37 straddling block shaped member 47 as seen in FIG. 2. End connector cap 14 is assembled by placing O-ring 61 in groove 30 (FIG. 2) with seal guide 32 placed against wall 22 as seen in FIG. 2. The end cap 14 is now inserted into the open end of body member 13 as shown in FIG. 1. Handle member 53 may now be snapped on.

Turning of handle member 53 (or rotation of protruding stem 38) turns or rotates ball 35 so that the throughbore 36 is selectively aligned with the throughbore 28 of portion 23 (FIG. 2) and with throughbore 22' of cap 14 or rotated so that throughbore 36 extends transverse to the axis of throughbore 28 to close off the opening through ball valve 10. Guides 31, 32 serve to seal and guide ball 35.

Of course, the parts may be made of any suitable materials, such as rubber for the O-rings and plastic for the remaining parts. Where possible, the parts may be molded as unitary pieces snap fitting together and, if desired, cemented together in any suitable manner. Of course, threaded connections may be used where applicable. Member 55 may also be of plastic with guides 31, 32 of Teflon material or the like.

It can be seen that there is described a ball valve which is quickly and easily assembled and eliminates the need for careful and precise machining. Extra machine work and expensive core pulls are not needed. The flexible O-rings 60, 61 behind the seal guides 31, 32 allows the seals to conform to ball 35 that may be slightly off round or to a stem that may be slightly off center.

I claim:

1. A ball valve comprising:
   a main valve body having a curved inner wall and an axially extending throughbore;
   an opening in the valve body extending transverse to the axis of said throughbore;
   a flange extending about said valve body having an opening therein forming a non-circular opening in said flange communicating with said opening in the valve body;
   a ball rotatably mounted internally in said valve body having a throughbore adapted to be coaxially aligned with said throughbore through said valve body, when in a first position, to allow fluids to pass through said ball valve, and adapted to seal off said throughbore through said valve body when in a second position;
   a valve stem mounted in said opening in said valve body having a generally cylindrical main body portion with key means at one end keyed to said ball and a handle portion at the other end extending out of said opening in said valve body, said stem also having a resilient O-ring mounted in a circular groove on the body portion of said stem having an outer diameter substantially the same as the inner diameter of the opening in said valve body between said key means and said handle portion sealing off fluid passing through interior of said valve body opening; and
   a stem retainer member loosely mounted in the opening in said flange and having an outer configuration conforming to said non-circular opening having said stem passing therethrough between said key means and said handle portion, said stem retainer member being curved on the surface thereof facing the inner wall of said valve body and abutting thereagainst, and being flat on the opposite surface thereof abutting against said stem key means, said stem retainer member further having a circular opening chamfered on the side thereof facing said ball and having an inner diameter conforming to the outer diameter of said O-ring and being configured similarly at its chamfered area to the outer configuration of said O-ring.

2. In the ball valve of claim 1 wherein said stem includes a flange thereon remote from said handle portion with said key means being a block shaped member extending along the surface of said flange opposite the side thereof connected to said handle portion, said block-shaped member entering said ball having a cut-out section in the outer surface thereof receiving said block-shaped member therein with said flat surface of said stem retainer member abutting against the surface of said flange remote from said block-shaped member.

3. In the valve of claim 1 wherein said valve body includes a first generally cylindrical section of a first diameter having said opening therein and a second generally cylindrical section of a second diameter less than said first diameter, said first cylindrical section being connected to said second cylindrical section by a tapered section with an internal shoulder at the intersection of said first section with said tapered section, said second section having a throughbore generally related to the throughbore in said ball, a resilient O-ring mounted in a groove in said shoulder and a Teflon guide seal ring mounted in said shoulder over said last-mentioned O-ring, said ball rotating within said guide seal ring; an end cap having an axially extending throughbore closing off the open end of said first section with a resilient O-ring mounted in a groove in the throughbore of said end cap, and a Teflon guide seal ring mounted in said end cap throughbore over said last-mentioned O-ring, said ball rotating within said last mentioned guide seal ring.

4. A method for assembling a ball valve including a generally cylindrical valve body having a generally circular throughbore with an opening in said valve body communicating with said throughbore, a ball having a throughbore with a cut-out section in the outer surface of said ball, and a ball valve stem having a block-shaped member at one end, a handle portion at the other end, and a main body section having an annular groove therebetween the block shaped member and the handle portion, the method comprising the steps of:

providing a flange on the interior of said valve body with a non-circular opening in said flange communicating with the opening in said valve body;

forming a piece of material having a configuration generally conforming to the opening in said flange with an arcuate surface on one side conforming to the inner surface of said valve body and a flat surface on the other side thereof;

providing an opening through said piece of material and chamfering said opening on the flat side thereof;

inserting said piece of material into said space with said arcuate surface abutting the inner wall of said valve body and said chamfered opening aligned with said valve body opening;

sliding a resilient O-ring on said stem until it enters said groove externally of said valve body, said resilient O-ring having an outer diameter substantially the same as the inner diameter of said opening in said valve body and the chamfered opening in said piece of material and configured similarly thereto;

inserting the handle portion end of said stem through the opening in the piece of material and up through the opening in said valve body while manually holding said piece of material within said opening in said flange until said flat side thereof abuts against said block-shaped member and said O-ring engages said chamfered opening thereby compressing said O-ring and sliding it past said piece of material and into the opening in said valve body forming leakproof path between the exterior of said ball valve and the interior thereof past said valve stem; and inserting said ball into said valve body throughbore with the cut-out section thereof straddling said block-shaped member whereby turning of said handle portion rotates said ball to selectively align the throughbores in said ball and said valve body.

5. In the method of claim 4 including the step of providing ball seals in the interior of said valve body on opposite sides of said opening in said valve body for sealing said ball.

6. In the method of claim 5 including the step of providing resilient O-ring means in the interior of said valve body on the sides of said seals remote from said opening through said valve body.

7. In the method of claim 6 including the step of providing a shoulder about the inner wall of said valve body on one side of the opening through said valve body to provide a stop for said ball, one of said seals and one of said resilient means being associated with said shoulder.

8. In the method of providing an end cap to for claim 7 including the step of closing off the other end of the opening through said valve body having the other of said seal and the other of said resilient means associated therewith, said end cap providing a stop for said ball.

* * * * *

UNITED STATES PATENT AND TRADEMARK OFFICE
CERTIFICATE OF CORRECTION

PATENT NO. : 4,665,937

DATED : May 19, 1987

INVENTOR(S) : Rowland G. Hall

It is certified that error appears in the above-identified patent and that said Letters Patent are hereby corrected as shown below:

ON THE TITLE PAGE INSERT:

-- [73]     Assignee: King Bros. Industries
Valencia, California    --.

Signed and Sealed this

First Day of December, 1987

Attest:

DONALD J. QUIGG

*Attesting Officer*      *Commissioner of Patents and Trademarks*